United States Patent
Wilde

(10) Patent No.: US 10,019,401 B1
(45) Date of Patent: Jul. 10, 2018

(54) VIRTUALIZED TARGET CHANNEL ADAPTER

(71) Applicant: EMC IP Holding Company LLC, Hopkinton, MA (US)

(72) Inventor: Todd Wilde, Palo Alto, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 15/087,978

(22) Filed: Mar. 31, 2016

(51) Int. Cl.
*G06F 13/16* (2006.01)
*G06F 13/40* (2006.01)
*G06F 13/42* (2006.01)
*G06F 15/173* (2006.01)

(52) U.S. Cl.
CPC ...... *G06F 13/4022* (2013.01); *G06F 13/1673* (2013.01); *G06F 13/4027* (2013.01); *G06F 13/4282* (2013.01); *G06F 15/17331* (2013.01)

(58) Field of Classification Search
CPC ............. G06F 13/1673; G06F 13/4022; G06F 13/4027; G06F 13/4282; G06F 15/17331
See application file for complete search history.

(56) References Cited

U.S. PATENT DOCUMENTS

| | | | | |
|---|---|---|---|---|
| 6,594,712 B1 * | 7/2003 | Pettey | ...... | G06F 13/28 709/212 |
| 6,813,653 B2 * | 11/2004 | Avery | ...... | G06F 13/28 709/212 |
| 2005/0100033 A1 * | 5/2005 | Arndt | ...... | H04L 67/1097 370/412 |
| 2016/0182689 A1 * | 6/2016 | Lewis | ...... | H04L 69/18 370/466 |
| 2017/0171075 A1 * | 6/2017 | Sajeepa | ...... | H04L 45/745 |

OTHER PUBLICATIONS

Micheloni, Rino et al., Inside Solid State Drives (SSDs) (Springer Netherlands 2013); Chapter 2. SSD Architecture and PCI Express Interface, p. 19-45.*
Handbook of Fiber Optic Data Communication a Practical Guide to Optical Neworking (Elsevier 2014); Chapter 1. Transforming the Data Center Network, p. 3-22; Chapter 11. InfiniBand, iWARP, and RoCE, p. 267-287.*

* cited by examiner

*Primary Examiner* — Eric T Oberly
(74) *Attorney, Agent, or Firm* — Van Pelt, Yi & James LLP

(57) ABSTRACT

A target channel adapter in configured to generate and maintain for each of a plurality of endpoints a corresponding set of metadata. Each endpoint is associated with a corresponding set of storage modules and the set of metadata corresponding to each endpoint is associated with accessing storage locations in the set of storage modules associated with that endpoint. The target channel adapter is configured to use the set of metadata to provide to a remote client associated with a media access controller access to data stored in one or more of said storage modules.

18 Claims, 7 Drawing Sheets

VIRTUALIZED TARGET CHANNEL ADAPTER

BACKGROUND OF THE INVENTION

Efficient transfer of data from storage modules may happen over a single bus protocol, for example PCIe between hosts and a single set of storage modules. To scale out over more than one set of storage modules requires efficient transfer of data between the sets of storage modules using two bus protocols, for example both PCIe and Ethernet, which includes using a target channel adapter.

BRIEF DESCRIPTION OF THE DRAWINGS

Various embodiments of the invention are disclosed in the following detailed description and the accompanying drawings.

DETAILED DESCRIPTION

Figure 1:
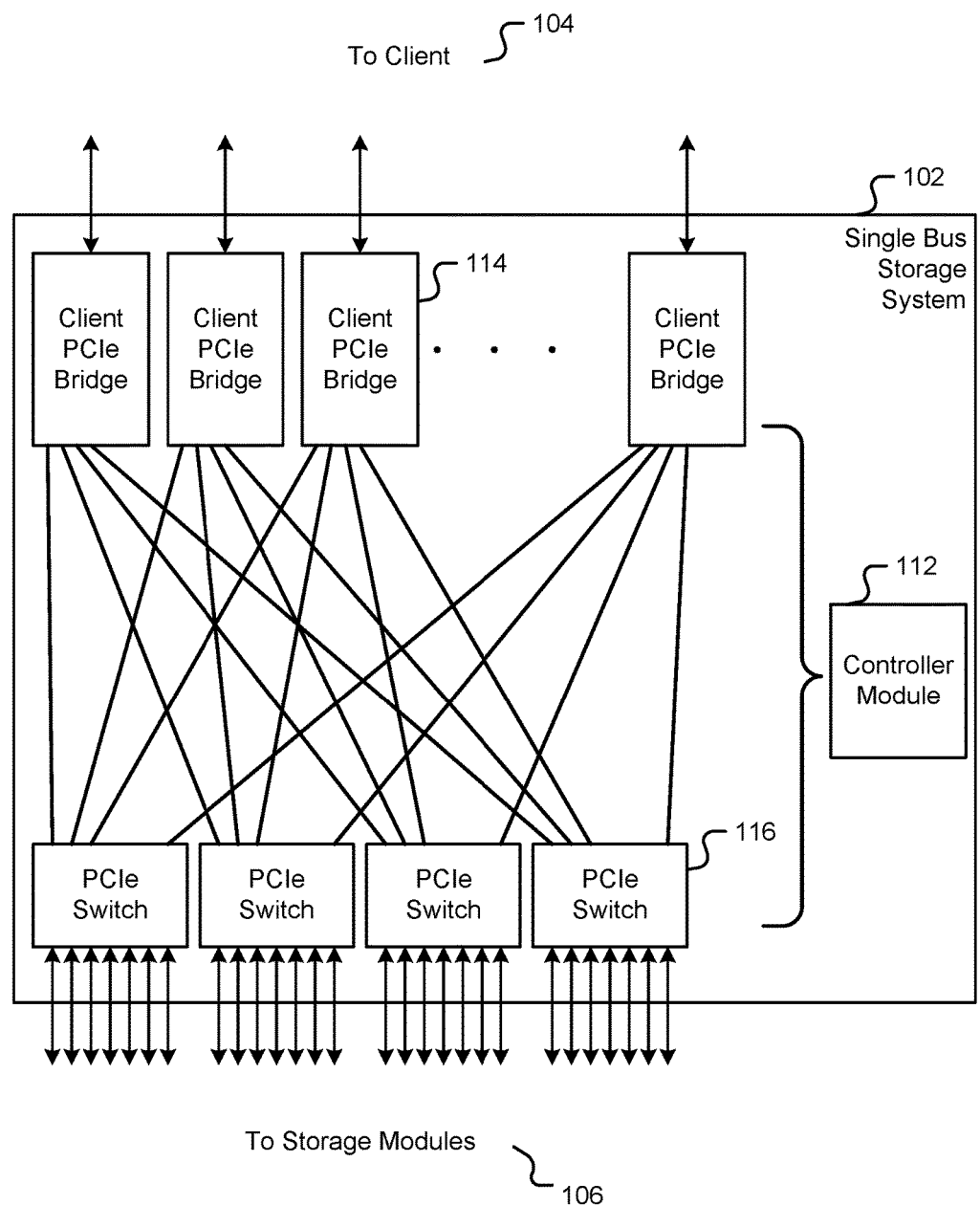
FIG. 1 is a block diagram illustrating an embodiment of a single bus storage system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Virtualizing one or more target channel adapters (TCAs) within a single silicon device is disclosed. Throughout this specification and without limitation, a TCA refers to any transport layer/engine for a network. Without limitation, an example of a TCA is a RoCE (RDMA over converged Ethernet) engine that bridges between an Ethernet bus and a PCIe bus with remote direct memory access (RDMA). In a given scenario, the logic circuitry comprising the TCA may be 'virtualized' by storing and retrieving different sets of metadata/context state, e.g., comprising queue-pairs, to expose a set of PCIe devices/endpoints, each with their own context state, to a set of Ethernet interfaces. Throughout this specification "Ethernet" refers to any protocol to form a high-speed network, including without limitation RapidIO, Infiniband, Gigabit Ethernet (1 GBe), 10 Gigabit Ethernet (10 GBe), 25 Gigabit Ethernet (25 GBe), 40 Gigabit Ethernet (40 GBe), and 100 Gigabit Ethernet (100 GBe). Throughout this specification "PCIe" refers to any protocol for a computer bus, including without limitation PCI, PCI-X, PCIe 1.0, PCIe 2.0, PCIe Gen3, QPI, and HyperTransport.

Before scaling out over, for example, Ethernet, it is helpful to review a single bus storage system. FIG. 1 is a block diagram illustrating an embodiment of a single bus storage system. Storage system (102) is coupled to one or more client(s) (104) and to a plurality of storage modules (106). In one embodiment between two and 36 storage modules (106) are coupled to storage system (102), and in one embodiment the storage module is a non-volatile memory module such as a NAND flash based module.

Storage system (102) comprises a controller module (112), which controls one or more client PCIe bridges (114) to couple the storage system (102) to a client (104). In one embodiment the PCIe Gen3 standard bus is used and up to 96 lanes of PCIe Gen3 is used across the one or more client PCIe bridges (114).

The client PCIe bridges (114) are coupled to a PCIe switch fabric (116), which in turn are coupled to the storage modules (106). In one embodiment the PCIe switch fabric (116) comprises four PCIe switch devices each attached to up to nine storage modules (106) by a 4-lane PCIe Gen3 coupling. Any person having ordinary skill in the art will appreciate without limitation that other link widths may be easily implemented instead of 4-lane PCIe Gen 3.

The storage system (102) is termed a "single bus" storage system because all data transfers in the system occur over a single bus, e.g., PCIe Gen3, maintaining matching input and output throughput.

In one embodiment, the single bus storage system (102) uses a "push" data transfer mode, which throughout this specification refers to a system of using PCI writes and DMA writes to affect a read so that the PCI read command is at least partially deprecated: The PCI read command requires round trip latency that reduces overall system performance.

For example, if a client (104) wishes to read from the storage modules (106), over PCI control traffic it may write a proprietary command to the controller module (112). The controller module (112) then impels the affected storage modules (106) to DMA/PCI write the data to the client (104) over the data path via the PCIe switch (116) and PCIe bridge (114). With a single bus system, no buffering is required as all throughputs are matched.

Figure 2A:
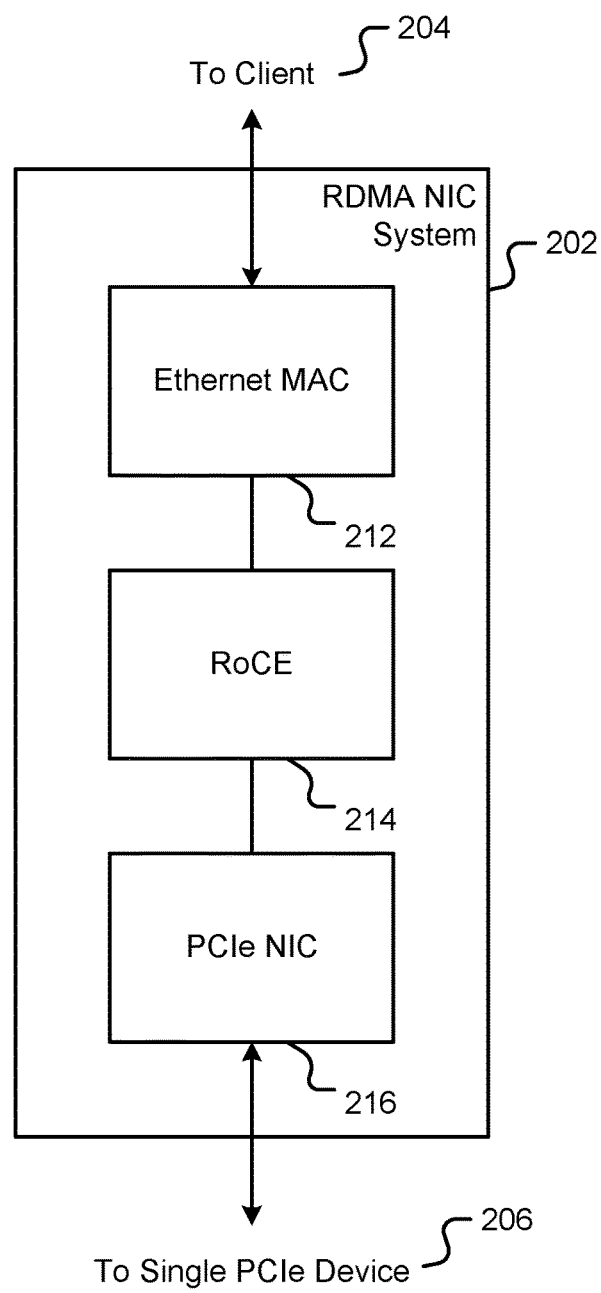
FIG. 2A is a block diagram illustrating a prior RDMA NIC system.

Below are two prior approaches to interfacing Ethernet clients to a PCIe device:

FIG. 2A is a block diagram illustrating a prior RDMA NIC system. The RDMA NIC system (202) couples one Ethernet client (204) with one PCIe device (206). The RDMA NIC system (202) comprises an Ethernet media access controller (MAC) (212) to interface between the Ethernet client (204) and a target channel adapter such as a RoCE engine (214). The RoCE (214) is also coupled to a PCIe NIC (216) which in turn is coupled to a PCIe device (206).

The limitation of an RDMA NIC system (202) as applied to the system shown in FIG. 1 with multiple clients (104) and a plurality of storage modules (106) is that only one client facing port and one back-end storage module port could be serviced with each RDMA NIC device (202).

Figure 2B:
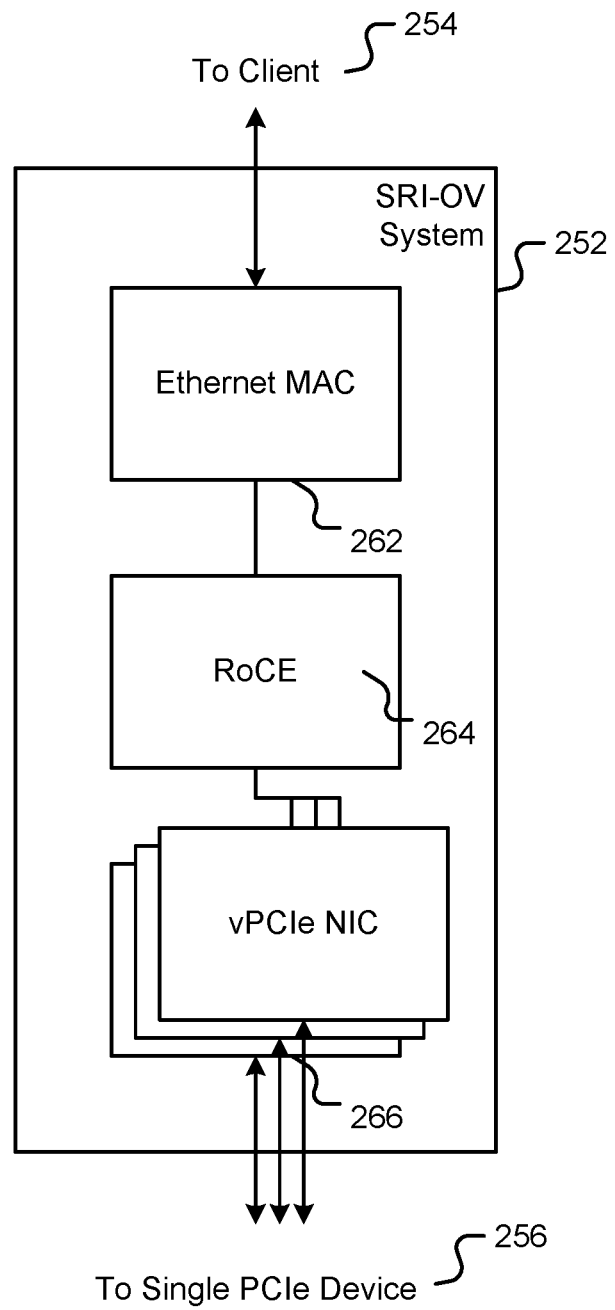
FIG. 2B is a block diagram illustrating a prior SRI-OV system.

FIG. 2B is a block diagram illustrating a prior SRI-OV system. The SRI-OV system (252) is a Single Root Input/Output Virtualization used with virtual machines and hypervisors. One SRI-OV system (252) couples one Ethernet client (254) with one PCIe device (256). This SRI-OV system (252) comprises an Ethernet MAC (262) to interface between the Ethernet client (254) and a target channel adapter such as a RoCE engine (264). The RoCE (264) is also coupled to a "virtualized" set of vPCIe NICs (266) which in turn are coupled to a single PCIe device (256). This allows multiple CPU cores to each see an individual instantiation of the RoCE device through a single PCIe interface.

This type of SRI-OV system thus allows each virtual machine on the client to approach the single PCIe device directly as if it were its own virtual PCIe device. This is not an appropriate solution as applied to the system shown in FIG. 1 with multiple clients (104) and a plurality of storage modules (106), since physical, and not virtual, PCIe devices need to be switched and addressed.

Figure 3:
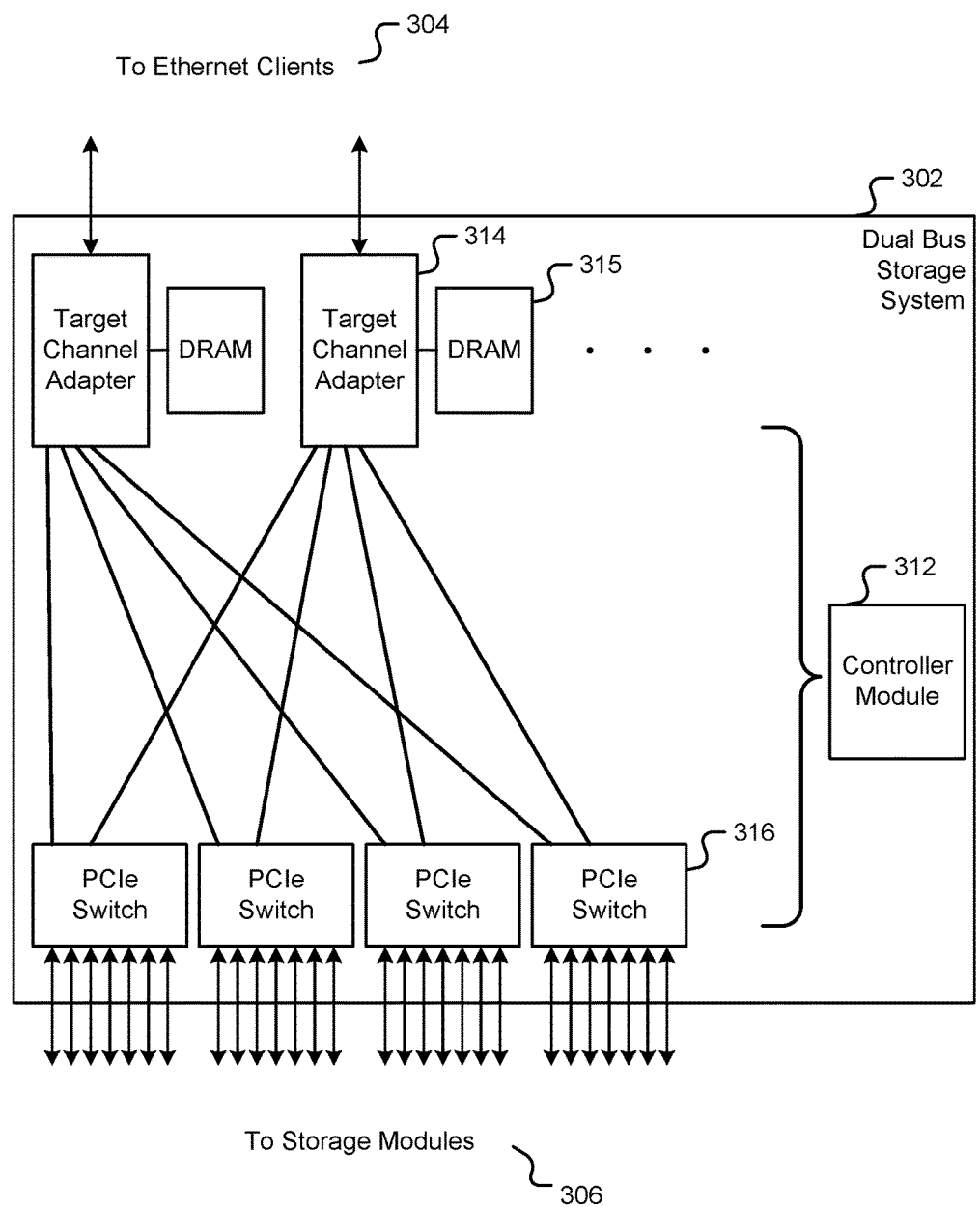
FIG. 3 is a block diagram is a block diagram illustrating an embodiment of a dual bus storage system.

FIG. 3 is a block diagram is a block diagram illustrating an embodiment of a dual bus storage system. The system in FIG. 3 is termed a "dual bus" storage system because data transfers in the system occur over one of two busses, e.g., PCIe Gen3 and Ethernet. Storage system (302) is coupled to one or more Ethernet client(s) (304) and to a plurality of storage modules (306), in one embodiment the same number and type of storage modules (106) as shown in FIG. 1.

Storage system (302) comprises a controller module (312), which controls one or more target channel adapters (314) to couple the storage system (302) to a client (304). In one embodiment for a given TCA (314) two 40 GBe Ethernet MAC (PHYs) are used to interface to the client (304). In one embodiment for a given TCA (314) eight 10 GBe MAC are used to interface to the client (304). In one embodiment a DRAM buffer (315) is used, but any person having ordinary skill in the art will appreciate without limitation that different buffering models may be used, including using an internal device SRAM.

In one embodiment, the TCA (314) are coupled to external DRAM buffers (315). DRAM buffers (315) are used to regulate the mismatch between the two busses; Ethernet and PCIe particularly used in "push" data transfer mode. The TCA (314) are coupled to a PCIe switch fabric (316), which in turn are coupled to the storage modules (306). As in FIG. 1, in one embodiment the PCIe switch fabric (316) comprises four PCIe switch devices each attached to up to nine storage modules (306) by a PCIe Gen3 coupling.

With prior systems a RoCE engine such as the one shown (214) in FIG. 2 would need to be replicated for each connection to a PCIe switch (316). For example, under prior approaches, in the example shown in FIG. 3 each target channel adapter 314 would need to include four physically separate RoCE engines, such as four logic circuits, one for each of the four PCIe switches 316, each of which is a PCIe endpoint.

Techniques to virtualize a single RoCE engine (logic circuit) to enable the same RoCE engine to be used to access multiple PCIe or other endpoints are disclosed.

Figure 4:
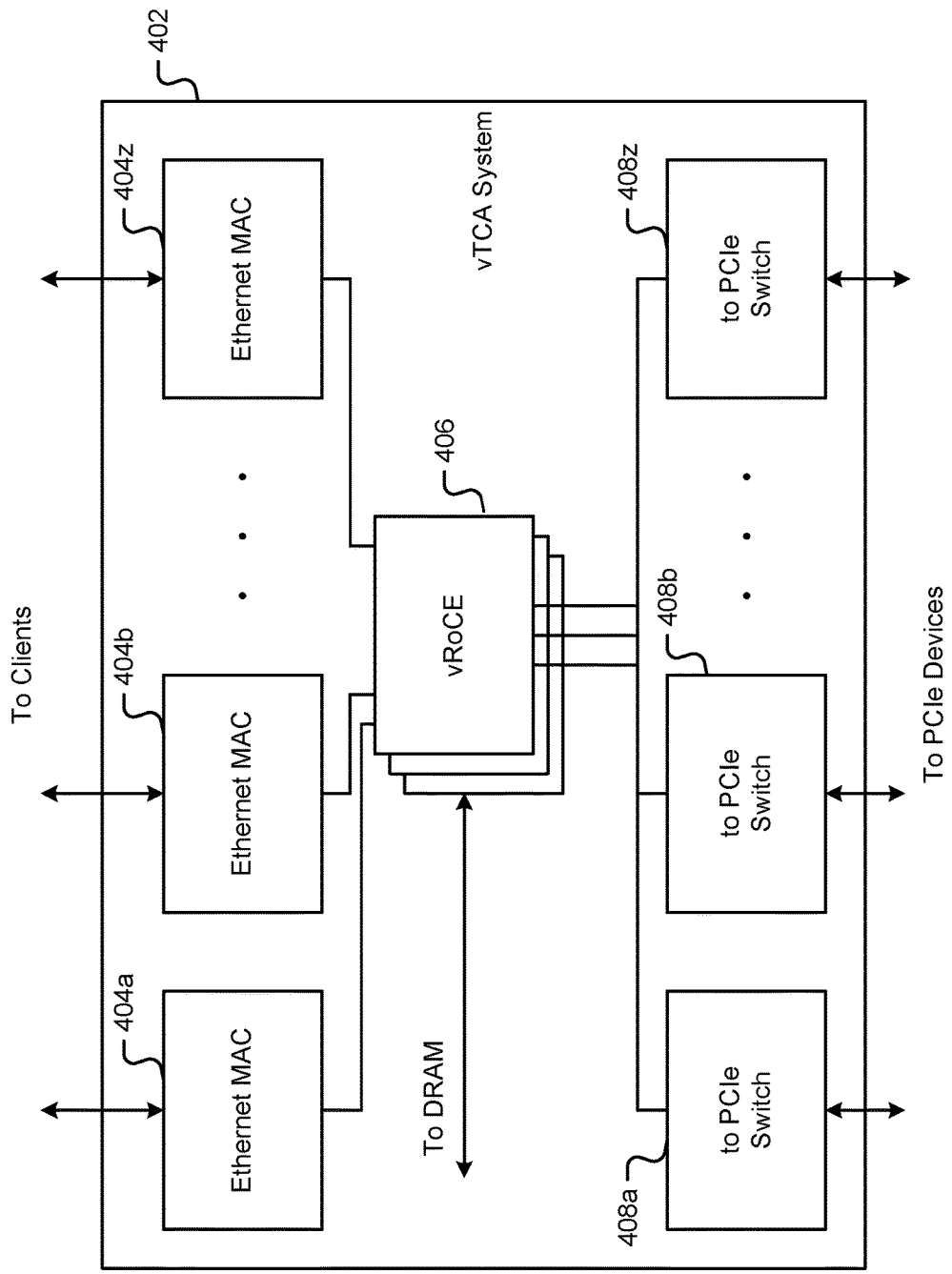
FIG. 4 is a block diagram illustrating an embodiment of a virtualized TCA system.

FIG. 4 is a block diagram illustrating an embodiment of a virtualized TCA system. In one embodiment, the vTCA system (402) is included as block (314) in FIG. 3.

In the example shown, vTCA system (402) uses a plurality of Ethernet MACs (404a)-(404z) to couple Ethernet clients to the virtualized RoCE (vRoCE) engine (406). The vRoCE engine (406) is in turn coupled to a plurality of PCIe switches (408a)-(408z). The mechanism for the target virtualization is to use a separate Physical Function within a single PCIe interface for each physical Ethernet interface within the device. In the manner, each PCIe-Ethernet interface combination is virtualized as a different RoCE engine. For instance, in a system with 4 PCIe interfaces, and two Ethernet interfaces, 8 RoCe engines, each operating independently are virtualized using the same underlying hardware circuitry within the device.

As the throughput associated with the respective Ethernet and PCIe bus speeds are lower compared to speeds attainable by modern silicon process technology, silicon real estate reduction can be realized with the vRoCE. In one embodiment, the virtualized RoCE (406) comprises a single logic circuit configured to perform RoCE engine processing and for each virtual instance of the single RoCE engine, each virtual instance corresponding to a corresponding one of the PCIe endpoints (408), a corresponding PCIe endpoint specific context metadata (408a)-(408z), for example by storing and retrieving queue-pairs, updating a queue-pair table, and/or accessing DRAM for a given PCIe endpoint/Ethernet MAC pair. In one embodiment, each Ethernet interface is exposed though a separate RoCE device from each PCIe interface. For instance a 3-port PCIe, 2-port Ethernet device would have 6 virtualized RoCE engines. Thus, with the use of a vRoCE, a client associated with an Ethernet MAC/PHY (404a) can address each of the plurality of PCIe endpoints (408a)-(408z) using a single, shared vRoCE logic circuit.

Figure 5:
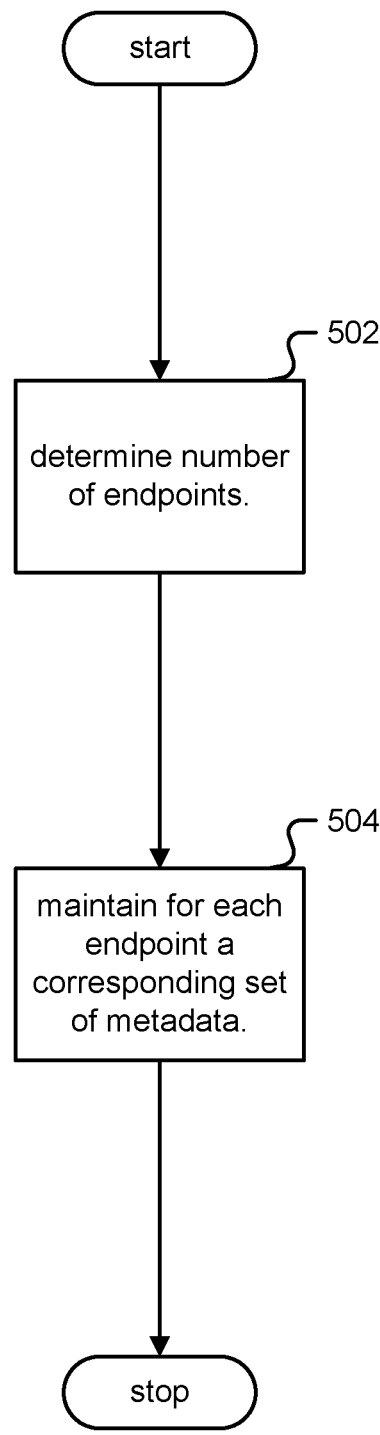
FIG. 5 is a flow chart illustrating an embodiment of a process for a virtualized TCA.

FIG. 5 is a flow chart illustrating an embodiment of a process for a virtualized TCA. In one embodiment, the flow chart in FIG. 5 is carried out by vTCA (406) in FIG. 4.

In step 502, the number of exposed endpoints are determined, for example PCIe endpoints (408a)-(408z), In step 504, a logic circuit, for example a vTCA, is configured to generate and maintain for each the number of exposed endpoints a corresponding set of metadata. Each endpoint is associated with a corresponding set of storage modules (306) and the set of metadata corresponding to each endpoint is associated with accessing storage locations in the set of storage modules associated with that endpoint. The target channel adapter is configured to use the metadata for RDMA.

Figure 6:
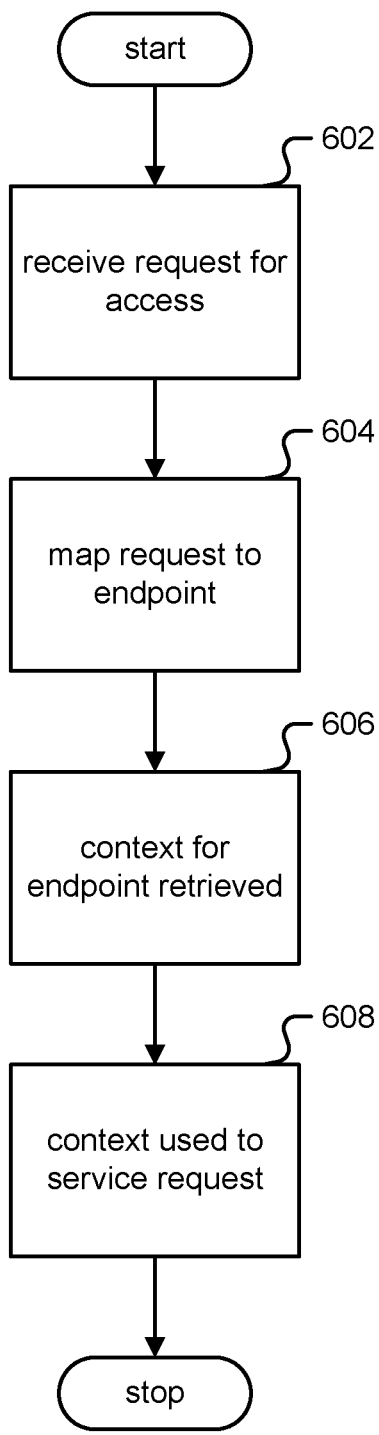
FIG. 6 is a flow chart illustrating an embodiment of a process to provide access to multiple endpoints via a virtualized RoCE circuit.

FIG. 6 is a flow chart illustrating an embodiment of a process to provide access to multiple endpoints via a virtualized RoCE circuit. In one embodiment, the process of FIG. 6 is included in step 504 in FIG. 5.

In step 602, a request is received for access associated with a requested storage module. In one embodiment, the request is received by controller module (312). Examples of access requests include requests for reading and requests for writing. In the event of a request for a read, the controller module (312) may elect to set up a "push" read using DMA writes as described in FIG. 1.

In step 604, the request is mapped to an assigned endpoint associated with the requested storage module. In one embodiment, the controller module (312) determines/maps the request to a switch (316) associated with the requested storage module (306).

In step 606, context data associated with the assigned endpoint is retrieved. For example, if the assigned PCIe endpoint (408b) is associated with the PCIe switch for the requested storage module, then the vRoCE (406) has context data associated with endpoint (408b) retrieved. The may include retrieving queue-pairs for endpoint (408b), updating a queue-pair table to include queue-pairs for endpoint (408b), and/or accessing DRAM for a pairing of the endpoint (408b) and the Ethernet MAC associated with the access requestor, for example (404a).

In step 608, context data is used with the shared RoCE logic circuit to service the request. To the Ethernet MAC (404a), the target channel adapter appears to be dedicated to exposing PCIe endpoint (408b) for RDMA access, including the writing, reading, or "push" reading access requested.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a plurality of endpoints;
   a media access controller, wherein the media access controller is associated with an Ethernet interface and the plurality of endpoints are each PCIe endpoints, and wherein the Ethernet interface is exposed separately and independently through a virtualized RoCE Engine to each PCIe endpoint;
   a target channel adapter coupled with the plurality of endpoints and coupled with the media access controller, wherein the target channel adapter is a transport layer engine logic circuit configured to:
   generate and maintain for each of the plurality of endpoints a corresponding set of metadata,
   wherein each endpoint is associated with a corresponding set of storage modules and the set of metadata corresponding to each endpoint is associated with accessing storage locations in the set of storage modules associated with that endpoint; and
   use the set of metadata and a memory access logic shared across the plurality of endpoints to provide to a remote client associated with the media access controller access to data stored in one or more of said storage modules.

2. The system of claim 1, wherein each PCIe endpoint is coupled with a four-lane PCIe Gen3 switch.

3. The system of claim 1, wherein the system is exposed separately and independently at least in part by using a separate Physical Function.

4. The system of claim 1, wherein providing to the remote client access to data is done over RDMA.

5. The system of claim 1, wherein the corresponding set of metadata for each Ethernet PCIe pair comprises an RoCE context state.

6. The system of claim 5, wherein the RoCE context state comprises one or more of the following: a set of queue-pairs and a table.

7. The system of claim 5, wherein the transport layer engine logic circuit configured to use the set of metadata and a memory access logic comprises the transport layer engine logic circuit being configured to:
   receive a request for access to a requested storage module;
   map the request to an assigned endpoint associated with the requested storage module;
   retrieve the RoCE context state associated with the assigned endpoint; and
   service the request using the RoCE context state.

8. The system of claim 1, wherein a client bus associated with the media access controller is different from a storage bus associated with the plurality of endpoints.

9. The system of claim 8, wherein the client bus is associated with an Ethernet protocol and the storage bus is PCIe.

10. The system of claim 9, wherein the Ethernet protocol is at least one of the following: 10 GbE, 25 GbE, 40 GbE, and 100 GbE.

11. The system of claim 1, wherein the media access controller is coupled to four transceivers.

12. The system of claim 1, further comprising:
    a controller module coupled with the plurality of endpoints and configured to direct control requests; and
    a memory buffer coupled with the target channel adapter and configured to accept data associated with the push transfer.

13. The system of claim 12, wherein the controller module is further configured to direct a read request to a push read transfer, wherein the push read transfer comprises using the controller module only for control traffic.

14. The system of claim 13, wherein the controller module is further configured to direct a read request to a push read transfer, wherein the push read transfer comprises using the controller module to push data from a storage module to a RDMA accessible memory associated with a client associated with the media access controller.

15. The system of claim 14, wherein using the controller module to push data comprises first writing data from one or more storage modules to the memory buffer over PCIe, and second writing data from the memory buffer to the client over Ethernet.

16. The system of claim 1, wherein a client associated with the media access controller can address each of the plurality of endpoints as a different device.

17. A method, comprising:
    configuring a target channel adapter to generate and maintain for each of a plurality of endpoints a corresponding set of metadata;
    wherein the plurality of endpoints are each PCIe endpoints, and wherein an Ethernet interface is exposed separately and independently through a virtualized RoCE Engine to each PCIe endpoint;
    wherein each endpoint is associated with a corresponding set of storage modules and the set of metadata corresponding to each endpoint is associated with accessing storage locations in the set of storage modules associated with that endpoint; and
    wherein the target channel adapter is configured to use the set of metadata to provide to a remote client associated with a media access controller access to data stored in one or more of said storage modules.

18. A computer program product, the computer program product being embodied in a non-transitory computer readable storage medium and comprising computer instructions for:
    configuring a target channel adapter to generate and maintain for each of a plurality of endpoints a corresponding set of metadata;

wherein the plurality of endpoints are each PCIe endpoints, and wherein an Ethernet interface is exposed separately and independently through a virtualized RoCE Engine to each PCIe endpoint;

wherein each endpoint is associated with a corresponding set of storage modules and the set of metadata corresponding to each endpoint is associated with accessing storage locations in the set of storage modules associated with that endpoint; and wherein the target channel adapter is configured to use the set of metadata to provide to a remote client associated with a media access controller access to data stored in one or more of said storage modules.

\* \* \* \* \*